United States Patent
Long et al.

(10) Patent No.: US 9,735,695 B2
(45) Date of Patent: Aug. 15, 2017

(54) METHOD AND APPARATUS FOR WIRELESS TRANSMISSION OF LINE FREQUENCY, LINE VOLTAGE ALTERNATING CURRENT

(71) Applicant: Momentum Dynamics Corporation, Malvern, PA (US)

(72) Inventors: Bruce Richard Long, Arlington, VA (US); Andrew W. Daga, Malvern, PA (US)

(73) Assignee: Momentum Dynamics Corporation, Malvern, PA (US)

( * ) Notice: Subject to any disclaimer, the term of this patent is extended or adjusted under 35 U.S.C. 154(b) by 443 days.

(21) Appl. No.: 14/553,340

(22) Filed: Nov. 25, 2014

(65) Prior Publication Data

US 2015/0145345 A1    May 28, 2015

Related U.S. Application Data

(60) Provisional application No. 61/909,721, filed on Nov. 27, 2013.

(51) Int. Cl.
*H02M 5/22* (2006.01)
*H02J 17/00* (2006.01)

(52) U.S. Cl.
CPC ............. *H02M 5/225* (2013.01); *H02J 17/00* (2013.01)

(58) Field of Classification Search
CPC .................................................... H02M 5/225
USPC ........................................................ 307/104
See application file for complete search history.

(56) References Cited

U.S. PATENT DOCUMENTS

| | | | |
|---|---|---|---|
| 3,727,122 A | 4/1973 | Hughes et al. | |
| 4,012,641 A | 3/1977 | Brickerd et al. | |
| 4,641,232 A | 2/1987 | Pitel | |
| 4,779,182 A * | 10/1988 | Mickal | B03C 3/68 323/903 |
| 2003/0035305 A1* | 2/2003 | Arai | H02M 3/28 363/17 |
| 2010/0014325 A1 | 1/2010 | Raju et al. | |
| 2013/0300209 A1 | 11/2013 | Long et al. | |

FOREIGN PATENT DOCUMENTS

DE    10 2011 116057 A1    4/2013

* cited by examiner

*Primary Examiner* — Joseph Chang
(74) *Attorney, Agent, or Firm* — Baker & Hostetler LLP

(57) ABSTRACT

A wireless power transmission circuit for wirelessly transmitting line frequency sinusoidal AC power to a load where the line frequency ripple filter of conventional circuits is eliminated and a DC-to-AC inverter is replaced by a simple polarity inversion circuit. The envelope of the high frequency AC on the AC line frequency source side is not constant but varies continuously in a half-sinusoidal fashion at the line frequency. Wireless transmission occurs only with a half-sinusoidal, constantly varying envelope, not the constant amplitude envelope of prior art. High frequency rectification and high frequency ripple filtering occurs as in the prior art but the ripple filter time constant is selected so that resulting waveform is an accurate replica of the rectified line frequency voltage present on the transmitter side. A polarity inversion stage replaces the DC-to-AC inverter of conventional art to generate the line frequency AC.

6 Claims, 4 Drawing Sheets

METHOD AND APPARATUS FOR WIRELESS TRANSMISSION OF LINE FREQUENCY, LINE VOLTAGE ALTERNATING CURRENT

CROSS-REFERENCE TO RELATED APPLICATIONS

This application claims the benefit of U.S. Provisional Application No. 61/909,721, filed Nov. 27, 2013, the disclosure of which is incorporated herein by reference in its entirety.

TECHNICAL FIELD

The invention relates to the transmission of electrical energy by means of resonant induction. More specifically, the invention relates to a method of wireless transmission that provides line frequency sinusoidal alternating current to the load with minimum circuit complexity.

BACKGROUND

Inductive power transmission has many important applications spanning many industries and markets. Although the disclosure contained here contemplates the use of this invention to applications requiring relatively high power (in excess of 100 watts), the potential list of power applications is not limited and this invention can be applied to a wide range of power requirements.

FIG. 1 shows a conceptual representation of a prior art resonant inductive power transmission system. A source of alternating electrical energy is applied to the primary of a loosely coupled, air gap transformer. Magnetic coupling between the transformer primary and the transformer secondary transfers some proportion of the primary side energy to the transformer secondary, which is removed by some distance from the primary. The magnitude of the magnetic field generated by the primary is proportional to the current flowing in the primary winding. For this reason, it is highly desirable to use resonance to increase the magnitude of the primary winding currents and in this way to maximize the magnitude of that portion of the primary winding magnetic field that is linked into or coupled into the secondary.

The magnetic flux from the primary induces a voltage into the secondary winding. Maximum secondary current and therefore maximum power transmission occurs when the secondary winding is resonant as well. The result is a two-pole resonant circuit consisting of two magnetically coupled resonant circuits. The resonant circuits can be parallel resonant with the inductor and capacitor wired in parallel or they can be series wired and series resonant. Furthermore the primary and secondary side resonances need not share the same form.

Resonant inductive power transfer provides a means for the wireless transference of electrical power. The most common application for such technology is for the wireless recharging of batteries. In its most common configuration, alternating current with a line frequency of 50-60 Hz is drawn from the electrical grid, converted to direct current and converted again to alternating current but at a frequency much higher than line frequency. Inductive transmission frequencies in the range of 20-100 kHz are commonly used. The conversion from line frequency to the much higher inductive transmission frequencies is necessary in order to reduce the size and weight of the wireless transmission inductive components.

FIG. 1 is a conceptual block diagram of a prior art resonant inductive wireless power transfer system. Alternating line current is rectified by line frequency rectifier 10 and ripple filtered by line frequency ripple filter 12 to convert the alternating lines current into direct current that is applied to a DC-to-AC inverter 14 that generates high frequency alternating current at the transmission transformer operating frequency. Transmission transformer 16 is an air core transformer having primary and secondary windings. In this diagrammatic representation, it also includes primary and secondary side resonating capacitors. On the secondary side of the transmission transformer 16, induced current is rectified by high frequency rectifier 18 and ripple filtered by high frequency ripple filter 20 thereby converting it into direct current that is applied to the load 22, usually a battery.

FIG. 1 also shows the system waveforms present at the interfaces between functional blocks. Waveform conversion proceeds as follows: Line Frequency AC→Rectified Line Frequency AC→DC→High Frequency AC→Rectified High Frequency AC→DC.

The final result of the waveform conversion chain shown in FIG. 1 is direct current, used in many wireless power applications for battery charging. However, in some wireless power transmission applications the desired end product is line frequency AC which, according to conventional art, may be implemented by incorporating an additional DC-AC inverter 24 waveform conversion stage, converting direct current into alternating current of the desired frequency as shown in prior art FIG. 2 for application to a line frequency AC load 26. There are many methods of direct current to line frequency alternating current conversion known to skilled practitioners of the arts. The most basic approach converts the dc current into a line frequency square wave which is then filtered into a sinusoid, or more commonly applied un-filtered to the AC load 26 in lieu of a sine wave with the sometimes harmful effects of the square wave harmonic content.

Multiple alternate DC-to-AC conversion methods have been developed that approximate the desired sinusoidal AC voltages to various degrees of accuracy. These include rectangular waveforms with positive, negative and zero voltage intervals, staircase waveforms with multiple output voltage levels and pulse width modulation waveforms that given sufficient time and amplitude resolution can generate arbitrarily good approximations of a sinusoidal output waveform. However, without special provisions, the frequency the AC waveform provided by these DC-to-AC conversion schemes is derived locally and is not synchronized with the line frequency. Another limitation arises because DC-to-AC inverters that generate low distortion sinusoidal output are unavoidably complex on the circuit level. The invention described herein avoids these limitations.

SUMMARY

The invention addresses the above-mentioned limitations of the prior art by providing a wireless power transmission circuit for wirelessly transmitting line frequency sinusoidal AC power to a load where the line frequency ripple filter of conventional circuits is eliminated and the secondary side DC-to-AC inverter is replaced by a simple polarity inversion circuit. With the removal of the line frequency ripple filter, the envelope of the high frequency AC developed by the primary side DC-AC inverter is no longer constant but varies continuously in a half-sinusoidal fashion. Wireless transmission occurs as in the prior art only with a half-sinusoidal, constantly varying envelope, not the constant amplitude envelope of the prior art. High frequency rectification and high frequency ripple filtering occurs as in the prior art but the ripple filter time constant is selected so that resulting waveform is an accurate replica of the rectified line frequency voltage present on the transmitter side. A polarity inversion stage replaces the DC-to-AC inverter of conventional art to generate the line frequency AC.

In an exemplary embodiment, the invention provides a wireless power transmission system for providing an AC line frequency to a load, comprising on the transmission side a line frequency rectifier that rectifies a source AC line frequency and a DC-to-AC inverter that inverts the rectified AC line frequency to an envelope modulated high frequency AC with an amplitude that varies continuously in a half-sinusoidal fashion at a line frequency rate, a resonant air gap wireless transmission transformer that transmits the envelope modulated high frequency AC, and on the receiver side a high frequency rectifier that rectifies the transmitted envelope modulated high frequency AC, a high frequency ripple filter that filters the rectified high frequency AC into a rectified line frequency AC, and a polarity inversion circuit that inverts every other half cycle of the rectified high frequency AC so as to create a line frequency sinusoidal voltage waveform for application to the load as the AC line frequency. In the exemplary embodiment, the polarity inversion circuit comprises an envelope detector and a polarity detector that are responsive to the envelope modulated high frequency AC to control polarity inversion timing of the polarity inversion circuit. Also, a time constant of the high frequency ripple filter is selected so that the rectified line frequency AC is an accurate replica of the rectified AC line frequency voltage present at an output of the line frequency rectifier on a transmission side of the transformer.

The invention also includes a method for providing wireless power transmission at an alternating current (AC) line frequency to a load including the steps of rectifying a source AC line frequency, inverting the rectified AC line frequency to an envelope modulated high frequency AC with an amplitude that varies continuously in a half-sinusoidal fashion at a line frequency rate, wirelessly transmitting the envelope modulated high frequency AC over a resonant air gap wireless transmission transformer, rectifying the transmitted envelope modulated high frequency AC, filtering the rectified high frequency AC into a rectified line frequency AC, inverting every other half cycle of the rectified high frequency AC so as to create a line frequency sinusoidal voltage waveform, and applying the line frequency sinusoidal voltage waveform to the load as the AC line frequency. In an exemplary embodiment, the polarity inverting step comprises detecting an envelope of the rectified line frequency AC and inverting the polarity of every half cycle of the rectified line frequency AC using a polarity detector. Also, a time constant of the filtering step is selected so that the rectified line frequency AC is an accurate replica of the rectified AC line frequency voltage present in the rectifying step on a transmission side of the transformer.

BRIEF DESCRIPTION OF THE DRAWINGS

The foregoing and other beneficial features and advantages of the invention will become apparent from the following detailed description in connection with the attached figures, of which.

DETAILED DESCRIPTION OF ILLUSTRATIVE EMBODIMENTS

The present invention may be understood more readily by reference to the following detailed description taken in connection with the accompanying figures and examples, which form a part of this disclosure. It is to be understood that this invention is not limited to the specific products, methods, conditions or parameters described and/or shown herein, and that the terminology used herein is for the purpose of describing particular embodiments by way of example only and is not intended to be limiting of any claimed invention. Similarly, any description as to a possible mechanism or mode of action or reason for improvement is meant to be illustrative only, and the invention herein is not to be constrained by the correctness or incorrectness of any such suggested mechanism or mode of action or reason for improvement. Throughout this text, it is recognized that the descriptions refer both to methods and software for implementing such methods.

A detailed description of illustrative embodiments of the present invention will now be described with reference to FIGS. 3-4. Although this description provides a detailed example of possible implementations of the present invention, it should be noted that these details are intended to be exemplary and in no way delimit the scope of the invention.

Figure 1:
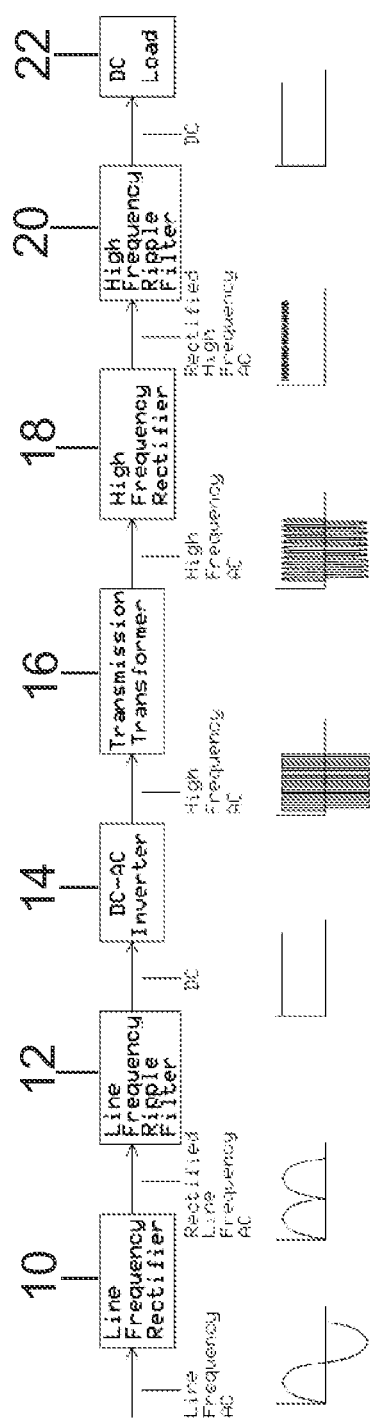
FIG. 1 shows a conceptual representation of a prior art resonant inductive power transmission system drawing line frequency power and wirelessly providing DC power to a load.
Figure 2:
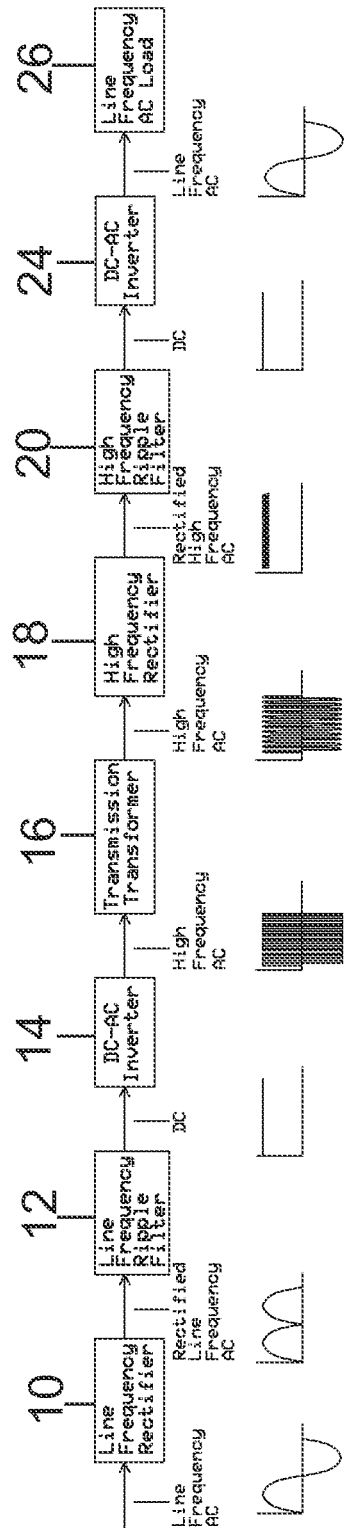
FIG. 2 shows a conceptual representation of a prior art resonant inductive power transmission system drawing line frequency power and wirelessly providing AC power to a load. This system is essentially identical to the system shown in FIG. 1 with the addition of a final DC-AC, 60 Hz inverter stage.
Figure 3:
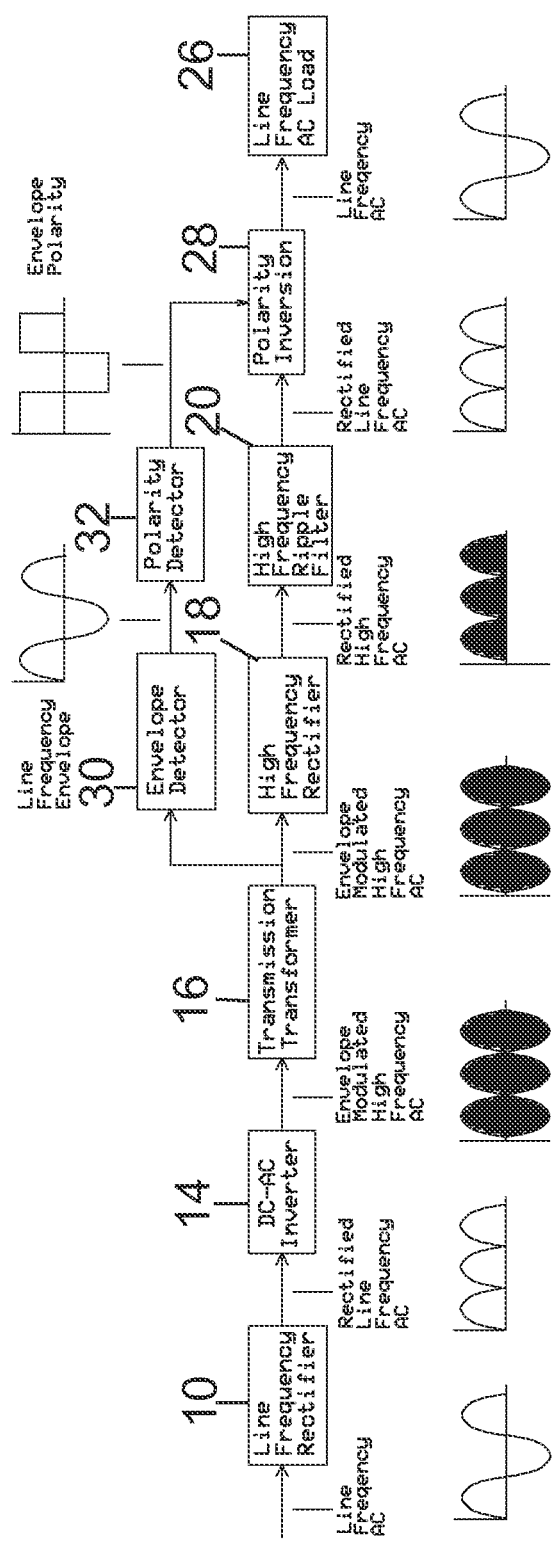
FIG. 3 shows a conceptual representation of the apparatus for wireless transmission of AC line frequency power in accordance with the invention.

A conceptual representation of an apparatus for wirelessly transmitting line frequency sinusoidal AC power to a load is shown in FIG. 3. The first deviation from prior art occurs on the transmitter side of the system. Specifically, the line frequency ripple filter 12 of conventional circuits is absent, and the DC-to-AC inverter 14 is driven by a rectified AC waveform, not by filtered, direct current. This means the envelope of the high frequency AC is not constant but varies continuously in a half-sinusoidal fashion. Wireless transmission occurs as before only with a half-sinusoidal, constantly varying envelope, not the constant amplitude envelope of the prior art. High frequency rectification by high frequency rectifier 18 and high frequency ripple filtering by high frequency ripple filter 20 occurs as in the prior art but the ripple filter time constant is selected so that resulting waveform is an accurate replica of the rectified line frequency voltage present on the transmitter side. A polarity inversion stage 28 replaces the DC-to-AC inverter 24 of prior art FIG. 2.

Every other half-sinusoid-half-cycle is polarity inverted to produce a conventional sinusoidal voltage. Polarity inversion timing is controlled by the envelope detection functions performed by envelope detector 30 and polarity detector 32 as shown in FIG. 3. Because the envelope detector 30 and polarity detector 32 use the rectified-half-sinusoid amplitude envelope of the wirelessly transmitted high frequency AC, the line frequency sinusoidal voltage applied to the line frequency load is an exact, instantaneous replica of the line frequency waveform applied to the transmitter.

Further advantages accrue because the DC-to-sinusoidal AC conversation function of the prior art is replaced with a simple polarity inversion stage. As a result, complicated sinusoidal approximation methods are not needed, which leads to a favorable embodiment having reduced circuit complexity.

Figure 4:
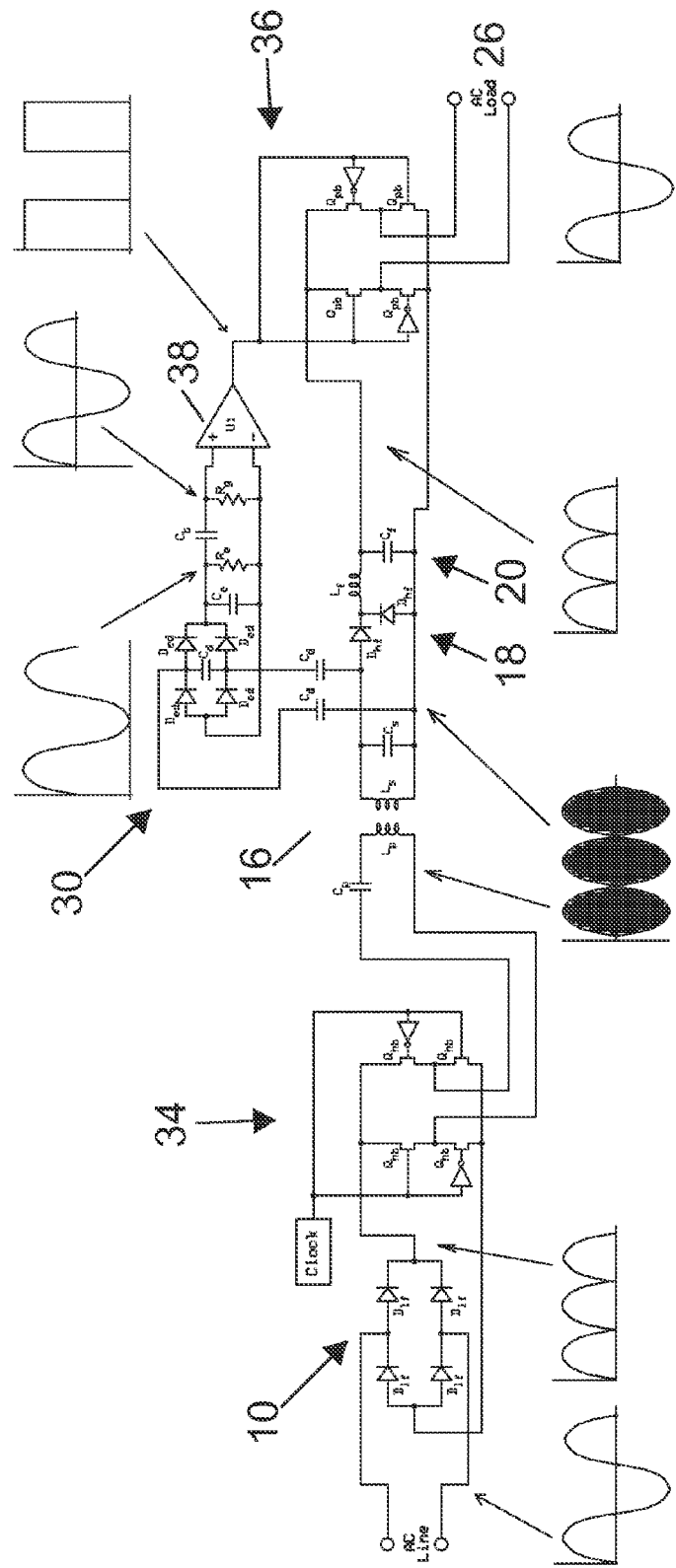
FIG. 4 shows an exemplary embodiment of the apparatus for wireless transmission of AC line frequency power in accordance with the invention.

FIG. 4 shows an exemplary embodiment of the invention. As illustrated, alternating line frequency voltage is rectified in a bridge rectifier 10 comprised of Diodes $D_{lf}$ arranged as illustrated. The resulting rectified half-sine voltage waveform is applied to the power supply and return nodes of a conventional H-bridge 34 comprised of transistors $Q_{hb}$. The H-bridge 34 switches at a high frequency relative to the line frequency creating a voltage waveform having a sinusoidal envelope and a high frequency carrier that is essentially an amplitude modulated high frequency carrier with 100% sinusoidal modulation. This modulated waveform is applied to the primary side of a resonant air gap transformer 16 for wireless transmission to the secondary side of the transformer. $L_p$ and $L_s$ are the primary and secondary side winding self-inductances. $C_p$ is the primary side resonating capacitor which also functions as a DC blocking capacitor. $C_s$ is the secondary side resonating capacitor. The transformer secondary side voltage is applied to a high frequency power rectifier circuit 18 comprised of diodes $D_{hf}$, inductor $L_f$ and capacitor $C_f$. The inductor $L_f$ and capacitor $C_f$ comprise a ripple filter 20 with a short time constant that removes the high frequency ripple components while having essentially no effect on the line frequency envelope. The resulting rectified half-sine voltage is applied to the power supply and return nodes of a second H-bridge circuit 36 comprised of transistors $Q_{pb}$ which provides a polarity inversion function. When the H-bridge control voltage from the voltage comparator 38 is high, the polarity inversion H-bridge 36 passes the positive going half-sinusoid waveform with no change in polarity. Conversely, when the H-bridge control voltage from the comparator 38 is zero, the H-bridge 36 inverts the half-sinusoid waveform producing in this way the negative half sinusoid portions of the output waveform for application to the AC load 26.

The polarity inversion control signal originates with a sample of the resonant air gap transformer secondary winding voltage derived by capacitors $C_d$ which function as a voltage divider. This amplitude scaled version of the transformer secondary voltage is applied to a diode bridge comprised of diodes $D_{ed}$ which functions as a full wave envelope detector 30. High frequency ripple in the envelope detected waveform is removed by components $C_e$ and $R_e$ which make up a high frequency filter which has a time constant too small to materially affect the envelope. The envelope detected, high frequency filtered signal passes through a DC Blocking capacitor $C_b$ and across a DC pull down resistor $R_g$ going into the input of voltage comparator 38. The voltage comparator 38 creates a positive output voltage when the detected, filtered and DC blocked waveform has positive polarity and a zero output voltage when the applied waveform has negative polarity. This polarity control signal when applied to the polarity inversion H-bridge 36 converts the half-sinusoidal voltage waveform provided by rectifier and filter components $D_{hf}$, $L_f$ and $C_f$ into the continuous sinusoidal voltage required by the AC load 26.

While various implementations have been described above, it should be understood that they have been presented by way of example only, and not limitation. Any of the elements associated with the systems and methods described above may employ any of the desired functionality set forth hereinabove. For example, while the preferred embodiment of this invention pertains to the provision of electrical power to vehicles, it should be understood that this is only one of many possible applications, and other embodiments including non-vehicular applications are possible. Thus, the breadth and scope of a preferred implementation should not be limited by any of the above-described exemplary implementations.

What is claimed:

1. A wireless power transmission system for providing an alternating current (AC) line frequency to a load, comprising:
   a line frequency rectifier that rectifies a source AC line frequency;
   a direct current (DC)-to-AC inverter that inverts the rectified AC line frequency to an envelope modulated high frequency AC with an amplitude that varies continuously in a half-sinusoidal fashion at a line frequency rate;
   a resonant air gap wireless transmission transformer that transmits the envelope modulated high frequency AC;
   a high frequency rectifier that rectifies the transmitted envelope modulated high frequency AC;
   a high frequency ripple filter that filters the rectified high frequency AC into a rectified line frequency AC; and
   a polarity inversion circuit that inverts every other half cycle of the rectified high frequency AC so as to create a line frequency sinusoidal voltage waveform for application to the load as the AC line frequency.

2. The system of claim 1, wherein the polarity inversion circuit comprises an envelope detector and a polarity detector that are responsive to the envelope modulated high frequency AC to control polarity inversion timing of the polarity inversion circuit.

3. The system of claim 1, wherein a time constant of the high frequency ripple filter is selected so that the rectified line frequency AC is an accurate replica of the rectified AC line frequency voltage present at an output of the line frequency rectifier on a transmission side of the transformer.

4. A method for providing wireless power transmission at an alternating current (AC) line frequency to a load, comprising:
   rectifying a source AC line frequency;
   inverting the rectified AC line frequency to an envelope modulated high frequency AC with an amplitude that varies continuously in a half-sinusoidal fashion at a line frequency rate;
   wirelessly transmitting the envelope modulated high frequency AC over a resonant air gap wireless transmission transformer;
   rectifying the transmitted envelope modulated high frequency AC;
   filtering the rectified high frequency AC into a rectified line frequency AC;
   inverting every other half cycle of the rectified high frequency AC so as to create a line frequency sinusoidal voltage waveform; and
   applying the line frequency sinusoidal voltage waveform to the load as the AC line frequency.

5. The method of claim 4, wherein the polarity inverting step comprises detecting an envelope of the rectified line frequency AC and inverting the polarity of every half cycle of the rectified line frequency AC using a polarity detector.

6. The method of claim 4, wherein a time constant of the filtering step is selected so that the rectified line frequency AC is an accurate replica of the rectified AC line frequency voltage present in the rectifying step on a transmission side of the transformer.

\* \* \* \* \*